United States Patent
Shouji

(10) Patent No.: US 7,726,819 B2
(45) Date of Patent: Jun. 1, 2010

(54) STRUCTURE FOR PROTECTING A ROD INTEGRATOR HAVING A LIGHT SHIELD PLATE WITH AN OPENING

(75) Inventor: Eisaku Shouji, Tokyo (JP)

(73) Assignee: NEC ViewTechnology, Ltd., Tokyo (JP)

( * ) Notice: Subject to any disclaimer, the term of this patent is extended or adjusted under 35 U.S.C. 154(b) by 775 days.

(21) Appl. No.: 11/580,030

(22) Filed: Oct. 13, 2006

(65) Prior Publication Data

US 2007/0115437 A1    May 24, 2007

(30) Foreign Application Priority Data

Nov. 24, 2005    (JP)    ............... 2005-339138

(51) Int. Cl.
G03B 21/14    (2006.01)

(52) U.S. Cl. .............. 353/97; 353/52; 353/57; 353/38; 353/119; 353/122; 385/15; 385/133; 385/901; 385/134; 385/147; 362/615; 362/616

(58) Field of Classification Search .......... 353/52, 353/38, 98, 99, 119, 122, 57, 97; 385/15, 385/34, 133, 146, 901, 147; 362/615, 616
See application file for complete search history.

(56) References Cited

U.S. PATENT DOCUMENTS

| 2002/0051122 A1* | 5/2002 | Kakuta et al. ............. 353/98 |
| 2003/0086066 A1 | 5/2003 | Kato |
| 2004/0239899 A1* | 12/2004 | Akiyama .................... 353/122 |
| 2005/0134804 A1* | 6/2005 | Hashimoto .................. 353/31 |
| 2007/0019165 A1* | 1/2007 | Ishikura ..................... 353/33 |
| 2007/0024815 A1 | 2/2007 | Oyama |

FOREIGN PATENT DOCUMENTS

| JP | 8-111107 | 4/1996 |
| JP | 10-253923 | 9/1998 |
| JP | 2001-228541 | 8/2001 |
| JP | 2001-359026 | 12/2001 |
| JP | 2002-318423 | 10/2002 |

(Continued)

OTHER PUBLICATIONS

Chinese Office Action dated Sep. 12, 2008 with English translation.

(Continued)

*Primary Examiner*—William C Dowling
*Assistant Examiner*—Sultan Chowdhury
(74) *Attorney, Agent, or Firm*—McGinn Intellectual Property Law Group, PLLC

(57) ABSTRACT

A structure for protecting a rod integrator that is used for a projection display apparatus is provided. The structure has: a protecting tube for the rod integrator, the protecting tube accommodating the rod integrator therein, wherein the protecting tube has openings which are defined at positions that face a light incident surface and a light exiting surface of the rod integrator, respectively; and a light shield plate that is provided between the opening and a light source for emitting light to the rod integrator, the opening facing the light incident surface of the rod integrator, wherein the light shield plate has an opening for allowing light to pass therethrough so that the light is incident on the rod integrator.

20 Claims, 3 Drawing Sheets

FOREIGN PATENT DOCUMENTS

| | | |
|---|---|---|
| JP | 2003-202523 | 7/2003 |
| JP | 2004-163481 | 6/2004 |
| JP | 2004-177478 | 6/2004 |
| JP | 2004-252205 | 9/2004 |
| JP | CN 1530737 A | 9/2004 |
| JP | CN 2664020 Y | 12/2004 |
| JP | 2005-70271 | 3/2005 |
| JP | 2005-292358 | 10/2005 |
| JP | 2007-33513 | 2/2007 |

OTHER PUBLICATIONS

English Translation of Japanese Office Action dated Mar. 24, 2010.

* cited by examiner

Flow of Cooling Air

STRUCTURE FOR PROTECTING A ROD INTEGRATOR HAVING A LIGHT SHIELD PLATE WITH AN OPENING

The present application is based on, and claims priority from, J.P. Application No. 2005-339138, filed on Nov. 24, 2005, the disclosure of which is hereby incorporated by reference herein in its entirety.

BACKGROUND OF THE INVENTION

1. Field of the Invention

The present invention relates to a structure for protecting a rod integrator and a projection display apparatus using the structure especially used as a digital cinema projector.

2. Description of the Related Art

With the reduction in size and improvement in performance of projection display apparatuses, which has been brought about through a rapid advance in liquid crystal technologies and DLP (Digital Light Processing; trademark) technologies, projection display apparatuses for projecting an image have been used in wider fields. The projection display apparatus is drawing attention as a front projector, which is a large projection display apparatus that is replacing conventional home-use television sets. The projection display apparatus has also been used for showing movies, as a digital cinema (DLP cinema) projector, because of the high resolution panel that enables the apparatus to project high-resolution images at full size.

Conventionally, a movie is displayed by projecting images stored in a video film onto a very large screen, for example, in a theater. Digital cinema is common to the conventional cinema in that images are projected and displayed on a very large screen. However, the digital cinema is different from the conventional cinema in that digital data are used for projection, instead of a film, and are projected onto a screen by a projection display apparatus, or by a digital cinema projector. The digital cinema largely differs from a front projector, which is used, for example, in a classroom or a conference room, in size, brightness, and reliability.

For example, a front projector typically employs an ultra-high pressure mercury lamp of approximately 300 W at the highest as a light source, whereas, a digital cinema projector requires a xenon lamp of 2 kW to 6 kW. Therefore, the amount of heat that is generated by a lamp and the size of a lamp, as well as danger, are incomparably larger than that of a front projector, and the entire size and the total weight of the apparatus also incomparably larger than that of a front projector.

A beam of light that is emitted from a xenon lamp based on an arc discharge usually has a circular cross section. However, the video display surface of a display device for generating images has a rectangular shape having an aspect ratio of, for example, 4:3, or 16:9, similar to images that are projected onto a screen. Although it is possible to cover the entire video display surface in the shape of a rectangle with a beam of light having the circular cross section, the circular cross section needs to be larger than a circle that circumscribes the rectangular video display surface. Since the area of the beam that is actually incident on the video display surface is smaller than the entire area of the beam, a large portion of the light is lost. Another disadvantage of this method is that the video display surface is brighter in its central region and darker in its peripheral region, and therefore, uniform brightness of a screen cannot be obtained. To cope with this problem, a special illuminating optical system using an element for uniformizing illumination, such as an integrator lens, which is a kind of fly-eye lens, a tubular light pipe, or a light tunnel, is used. The special illuminating optical system increases efficiency by converting a circular beam of light into a rectangular beam of light, which is similar to the shape of the video display surface, and also increases uniformity of brightness by overlapping light beams. Therefore, an integrator lens, a light pipe, or a light tunnel generally has a rectangular cross section which is similar to the rectangular video display surface of a display device. Digital cinema projectors often employ a xenon lamp as a high-output lamp and a display device comprising three DMDs (Digital Micromirror Devices). In such a digital cinema projector, a special illuminating optical system that employs a light tunnel or a light pipe (hereinafter referred to as a "rod integrator") is often used in combination with the projector in order to improve optical performance. In this arrangement, a beam of light having a circular cross section that is emitted from a lamp converges onto a rod integrator having a rectangular cross section by means of a lens or the like.

However, a lamp actually has a light-emitting point in a finite size. The point on which light converges also has a finite size. Further, a beam of light contains components that undesirably diverge from the main beam of the light. Therefore, it is impossible to make the entire beam of light converge onto the rod integrator within the rectangular cross section thereof. The undesirably diverging light is cut off by the opening of an element that constitutes a support mechanism which holds optical components, such as a rod integrator, and is also cut off by an incident surface of the rod integrator. The light that is radiated on the component of the support mechanism heats the component, causing an early deterioration of the component and making it difficult to keep the component reliable. If the converging light is emitted from a high-output lamp, then the metal component will soon be deteriorated unless it is cooled. The undesirably diverging light poses a large problem if it is emitted from a high-output lamp for use in a digital cinema projector, though it is not problematic if the light is emitted from a low-output lamp up to 300 W.

Japanese Patent Laid-Open Publication No. 2002-318423 discloses a video display apparatus having light shield plates to prevent undesirable illuminating light from entering optical components, and to prevent an excessive rise in the temperature of the optical components. The light shield plates are positioned in front of a color filter and a rod integrator that are disposed along the path of illuminating light. A heat radiator, which is integrated with each light shield plate, extends out of a mirror chamber to radiate undesirable heat energy that is inside the video display apparatus to the outside.

According to related art other than the art disclosed in the above-mentioned patent document, in order to cool optical components, cooling fins are provided on rod integrator holder 141 which constitutes support mechanism 120 for supporting an illuminating optical system. Rod integrator holder 141 is cooled by cooling air that is supplied to the cooling fins by means of cooling fan 161, as shown in FIG. 1. The illuminating optical system has a light source lamp that is housed in lamp housing 111, cold mirror 112 for reflecting light that is emitted from the light source lamp and for separating an infrared radiation from the light, a rod integrator, not shown, for receiving the light that is reflected by cold mirror 112, support mechanism 120 for supporting illuminating optical system, and display device unit 170 having an image display unit. Support mechanism 120 includes rod integrator holder 141 that houses and supports the rod integrator.

If a light source lamp of a high-output type is used, then the influence of the rod integrator on the incident surface is one of the largest concerns. Therefore, rod integrator holder 141 that houses the rod integrator therein has an opening whose shape is similar to the cross section of the incident surface of the rod integrator, and has cooling fins with a high cooling capability on its outer surface.

In recent years, the output of a lamp has been increasing to 6 kW or 7 kW in order to meet the requirements for higher brightness of an image. However, increased output has made it difficult to maintain optical component reliability for a long period of time as a result of the increased influence of undesirable light on optical components. In addition, a lamp used for a digital cinema projector is often replaced with another one having a different output, and other components of the digital cinema projector are used as they are because of, for example, the high cost of the projector. Specifically, only the lamp of a digital cinema projector is replaced with a lamp having a different output in order to use the digital cinema projector as a projector having a different luminance level, or in order to adjust the luminance level depending on the site where the digital cinema projector is installed, based on the consideration that a digital cinema projector is intended for a special purpose, i.e., digital cinema projection. In this example, it is necessary to prevent undesirable light and to keep the illuminating optical system cool for various kinds of lamps that may be used and that may have different output levels. Under these circumstances, a related art projection display apparatus are no longer capable of keeping components reliable for a long period of time.

SUMMARY OF THE INVENTION

It is an object of the present invention to provide a structure for protecting a rod integrator, wherein the structure is capable of protecting a rod integrator and a rod integrator holder from a temperature rise that may be caused by undesirable light, even when a lamp is replaced with another lamp having a different output.

It is another object of the present invention to provide a projection display apparatus that incorporates such a structure for protecting a rod integrator.

According to the present invention, a structure for protecting a rod integrator that is used for a projection display apparatus is provided. The structure comprises: a protecting tube for the rod integrator, the protecting tube accommodating the rod integrator therein, wherein the protecting tube has openings which are defined at positions that face a light incident surface and a light exiting surface of the rod integrator, respectively; and a light shield plate that is provided between the opening and a light source for emitting light to the rod integrator, the opening facing the light incident surface of the rod integrator, wherein the light shield plate has an opening for allowing light to pass therethrough so that the light is incident on the rod integrator.

An increase in temperature of the protecting tube is prevented because undesired light is reflected by the light shield plate.

The light shield plate may be arranged apart from the opening of the protecting tube that faces the light incident surface at a predetermined gap, wherein the opening of the light shield plate is similar in shape to the opening of the protecting tube that faces the light incident surface. Consequently, a compact arrangement can be obtained for the structure that is used to protect the rod integrator. A side of the opening of the light shield plate may be larger than a corresponding side of the opening of the protecting tube, the opening facing the light incident surface of the rod integrator, and the corresponding side of the opening may be larger than a corresponding side of a light incident surface of the rod integrator. Therefore, light is incident on the rod integrator without being obstructed. Furthermore, the light shield plate may be arranged independently of the protecting tube so that heat that is absorbed by the light shield plate is not directly transferred to the protecting tube.

A fan may be provided for supplying cooling air to a gap between the opening of the protecting tube, which faces the light incident surface of the rod integrator, and the light shield plate. Both the opening of the protecting tube and the light shield plate can be forced-air cooled by a single fan. The protecting tube may have cooling fins which are provided on an outer circumferential surface thereof, wherein the cooling fins are configured to be in contact with the cooling air that is supplied from the fan.

The light shield plate may be made of metal and may have a mirror-finish surface on a side of the light source. The light shield plate reflects most of the undesirable light, instead of absorbing it, and an increase in the temperature of the light shield plate is prevented.

A projection display apparatus according to the present invention is provided with the structure described above.

The above and other objects, features, and advantages of the present invention will become apparent from the following description with reference to the accompanying drawings which illustrate examples of the present invention.

DETAILED DESCRIPTION OF THE PREFERRED EMBODIMENT

A projection display apparatus according to an exemplary embodiment of the present invention will be described below. In this description, a digital cinema projection display apparatus in which a xenon lamp is used as a light source will be described as a preferred example for solving the problem, because an increase in the temperature of components that are related to a rod integrator, which is caused by undesirable light, is more problematic for a digital cinema projection display apparatus which employs a high-output xenon lamp. However, the present invention is not limited to a projection display apparatus that employs a xenon lamp, and is also applicable to an ordinary projection display apparatus employing a high-pressure mercury lamp.

Figure 1:
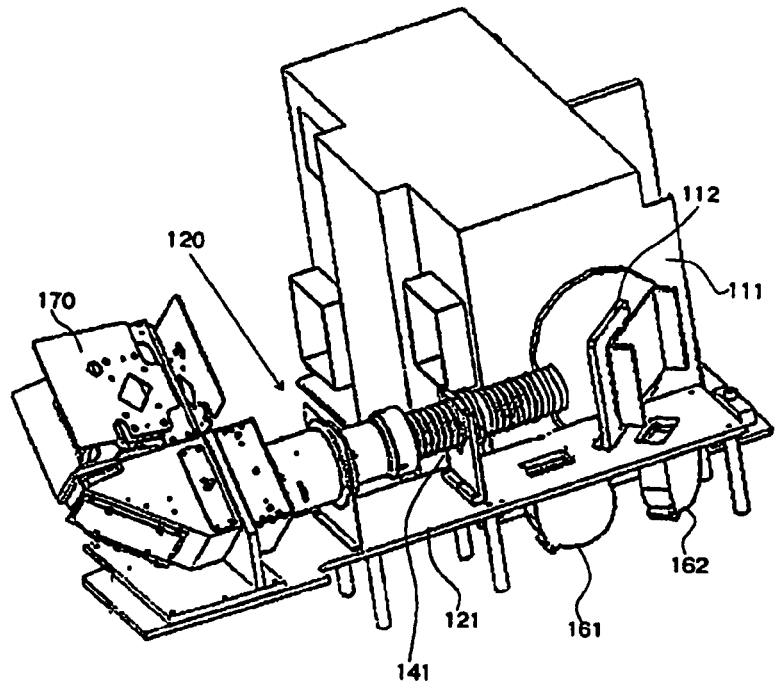
FIG. 1 is a perspective view of an optical system used for a projection display apparatus, schematically illustrating a structure for protecting a rod integrator according to related art.
Figure 2:
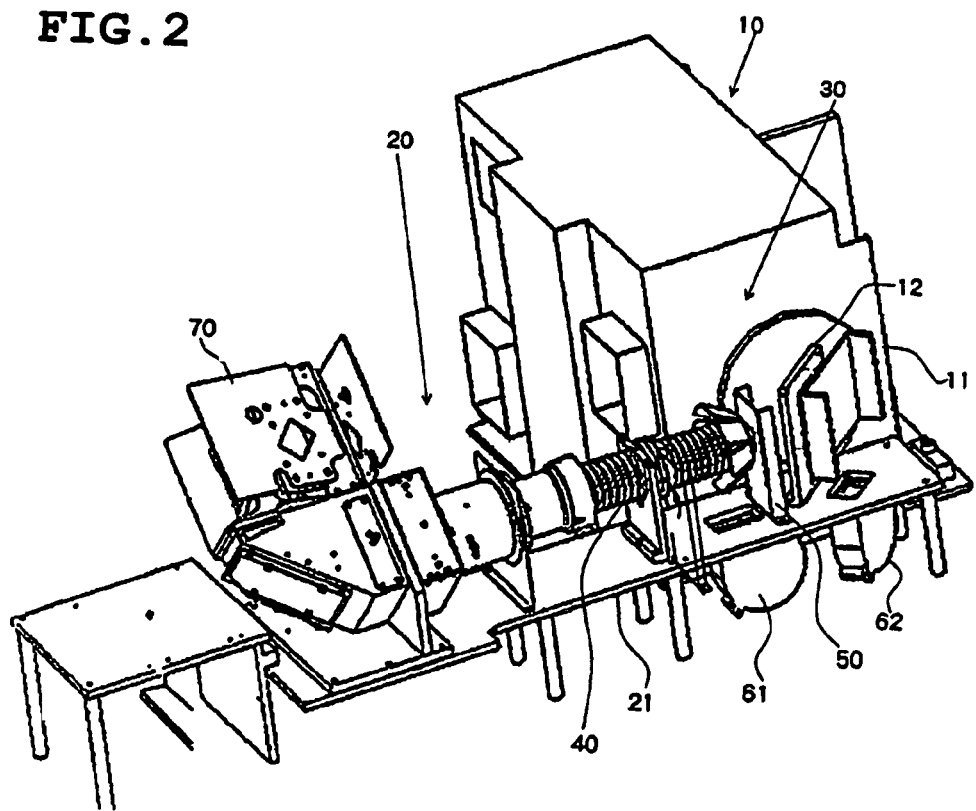
FIG. 2 is a perspective view of an optical system for a projection display apparatus, schematically illustrating a structure for protecting a rod integrator according to an exemplary embodiment of the present invention.
Figure 5:
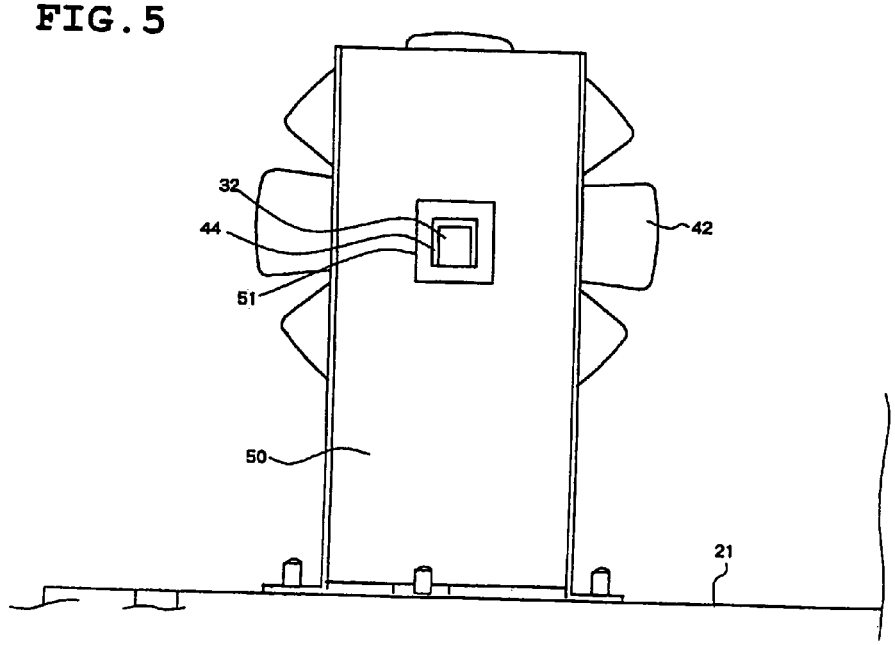
FIG. 5 is a side elevational view of the structure for protecting a rod integrator according to the exemplary embodiment of the present invention, as viewed from the side from which light is projected.

As shown in FIG. 2, in illuminating optical system 10 according to an embodiment of the present invention, a beam of light that is emitted from a xenon lamp, not shown, which is housed in lamp house 11, converges at cold mirror 12, and infrared radiation is cut off. Then, visible light is reflected by cold mirror 12 and passes through opening 51 (see FIG. 5) of light shield plate 50, which constitutes a part of structure 30 for protecting rod integrator 31 (see FIG. 3B) according to the present invention. The visible light that has passed through opening 51 of light shield plate 50 enters entrance opening 44 (see FIG. 3B), which also constitutes a part of structure 30 for protecting rod integrator 31. The visible light then enters incident surface 32 of rod integrator 31 that is held within protecting tube 40. Protecting tube 40 constitutes a part of support mechanism 20 for the illuminating optical system (see FIG. 2). As shown in FIG. 5, the size of entrance opening 44 of protecting tube 40 is larger than incident surface 32 of rod integrator 31. The size of opening 51 of light shield plate 50 is larger than that of entrance opening 44 of protecting tube 40 which is located at light entrance portion 43. Therefore, necessary light that is incident on rod integrator 31 is not obstructed, while undesirable light is efficiently reflected by light shield plate 50 and by light entrance portion 43. In this way, light entrance portion 43 serves as a second light shield plate.

A considerable portion of undesirable light is cut off by the surface of light shield plate 50, and the remaining portion of undesirable light is cut off by the peripheral edge of entrance opening 44 of protecting tube 40. Consequently, only necessary light is allowed to be incident on rod integrator 31.

Light that is incident on rod integrator 31 is repeatedly reflected by the reflecting surfaces of rod integrator 31, which define peripheral surfaces of rod integrator 31, and is converted into a light beam having a rectangular shape. The light then exits rod integrator 31 at light exiting surface 33 with increased uniformity. After exiting rod integrator 31, the light enters a display device, such as a DMD, which is disposed in display device unit 70, via lenses and mirrors, which are arranged in support mechanism 20, and the light is modulated by the display device. The image light that has been modulated is projected by a projection lens, not shown, onto a screen, not shown.

Figure 3A:
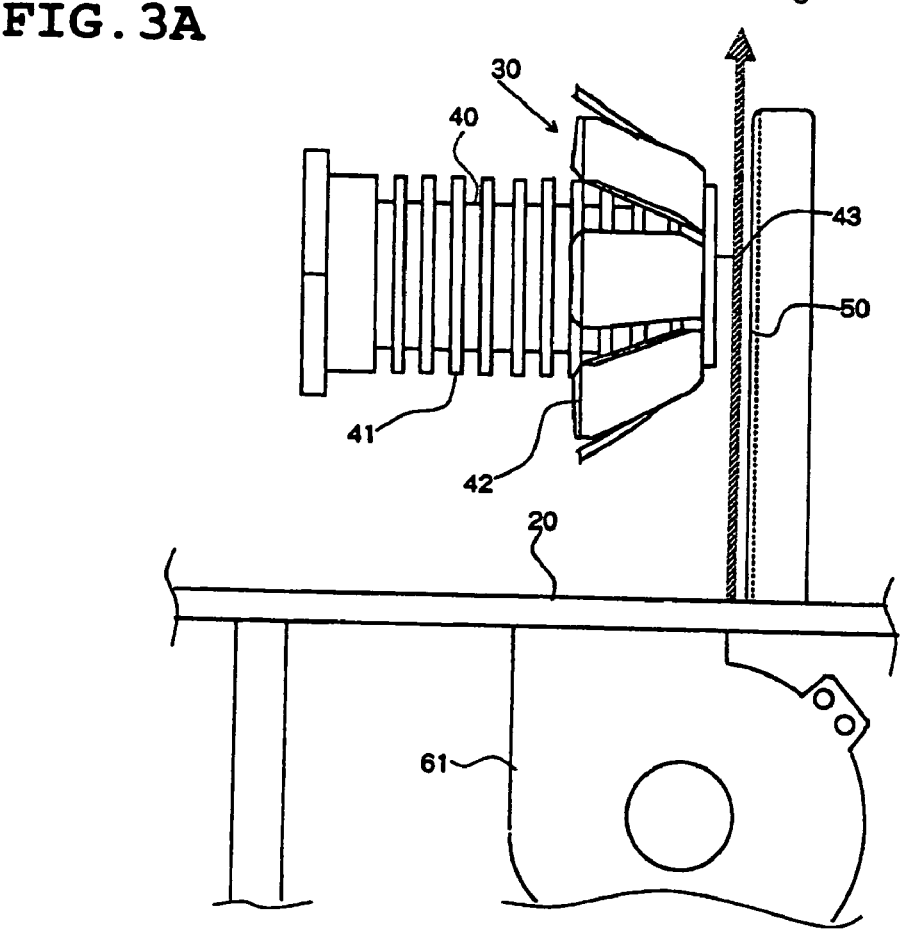
FIGS. 3A and 3B are side elevational and cross-sectional views, respectively, of the structure for protecting a rod integrator according to the exemplary embodiment of the present invention.
Figure 3B:
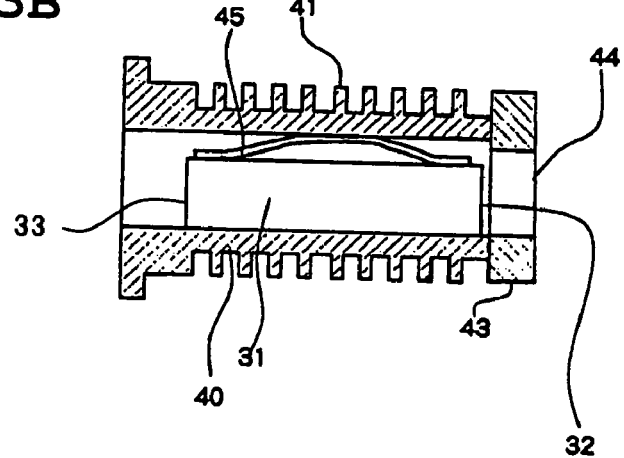

Rod integrator 31 is supported within protecting tube 40 usually by providing leaf spring 45 in protecting tube 40 in order to hold rod integrator 31 in place while accommodating different thermal expansions therebetween, as shown in FIG. 3B. Specifically, rod integrator 31 is normally made of glass, and protecting tube 40 is normally made of metal. Leaf spring 45 serves to mitigate stresses that are caused by the different thermal expansions of rod integrator 31 and protecting tube 40. Therefore, leaf spring 45 plays an important role as a holding mechanism. In related art, the leaf spring may have poor reliability because it tends to be easily deteriorated or damaged by an increase in the temperature that is caused by exposure to undesirable light. In addition, light entrance portion 43 of protecting tube 40 also tends to be deteriorated due to an increase in the temperature that may occur near incident surface 32 of rod integrator 31, and may suffer deterioration in long-term reliability. However, these problems are solved by providing light shield plate 50 having opening 51 according to the present invention. The projection display apparatus according to the present invention is free of the above problems and is highly reliable.

If undesired light is emitted from a high-output lamp, even the undesired light may greatly affect the long-term reliability of light shield plate 50. According to the exemplary embodiment, the surface of light shield plate 50 which faces the light source is finished with mirror-finish surface 52 (see FIG. 4) in order to reflect most of the undesirable light and thereby to prevent an increase in the temperature of light shield plate 50. Therefore, light shield plate 50 is also kept highly reliable. In general, a light shield plate is finished with a low reflectance surface, such as a black coating layer, in order to prevent stray light. However, in a projection display apparatus which employs a high-output lamp, as in the present embodiment, surface finishing with a low reflectance, such as a black coating layer, may cause excessive heating and a resulting a large increase in the temperature of the light shield plate.

According to the present embodiment, light shield plate 50 is arranged apart from light entrance portion 43 by a certain distance, as shown in FIG. 3A, and light shield plate 50 and protecting tube 40 are independently supported on support base 21 that is provided with a large heat radiating area, as shown in FIG. 2. Therefore, heat energy that is generated at light shield plate 50 is prevented from being directly transferred to light entrance portion 43.

Axial alignment of the light source is performed by changing the angle of the light source and/or the angle of the cold mirror. The optical components are arranged such that the light beam that is emitted from the light source is focused on the incident surface of the rod integrator. Axial alignment of the light source is achieved by positioning the focal point of the light beam substantially at the center of the incident surface of the rod integrator. At this time, the focal point of the light beam may move and may temporarily be positioned at various locations other than on the incident surface of the rod integrator. Since the lamp has a high intensity light beam which causes a large increase in temperature at the focal point, components on which the light beam is focused may easily be deteriorated or broken. According to the present embodiment, since light shield plate 50 having opening 51 is provided in addition to protecting tube 40, light shield plate 50 effectively prevents light entrance portion 43 of protecting tube 40 from being deteriorated or damaged due to an increase in temperature not only when the projection display apparatus is in normal use, but also when optical components are adjusted for axial alignment of the light source. Accordingly, tong-term reliability can be ensured.

Cooling air is supplied to the gap between light shield plate 50 and light entrance portion 43, which is formed by arranging light shield plate 50 apart from light entrance portion 43, by means of cooling fan 61 that is provided below light shield plate 50 and light entrance portion 43, as shown in FIG. 3A. Cooling air effectively cools both light shield plate 50 and light entrance portion 43 at the same time. If light shield plate 50 is arranged too apart from light entrance portion 43, then the illuminating optical system disadvantageously has a long light path, though the need to cool light shield plate 50 with cooling air supplied by cooling fan 61 may be reduced.

Figure 4:
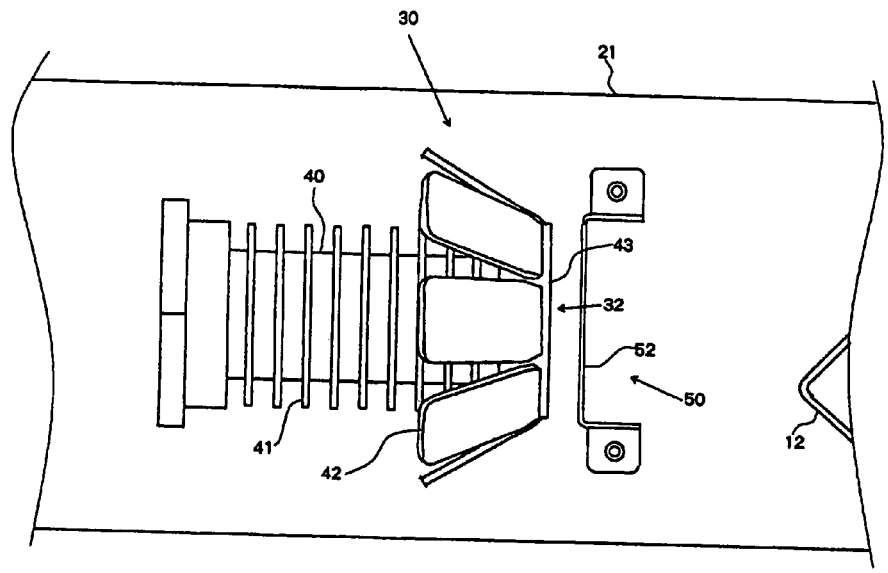
FIG. 4 is a schematic plan view of the structure for protecting a rod integrator according to the exemplary embodiment of the present invention.

As shown in FIGS. 3A, 3B, and 4, ring-like cooling fins 41 are provided at intervals on the outer circumferential surface of protecting tube 40, and vane-like cooling fins 42 are mounted on light entrance portion 43. Heat that is transferred from protecting tube 40 to cooling fins 41, 42 is radiated by the air flow that is generated by cooling fan 61. Though both ring-like cooling fins 41 and vane-like cooling fins 42 are illustrated in the exemplary embodiment, either or both of ring-like cooling fins 41 and vane-like cooling fins 42 may be omitted depending on temperature conditions.

Although a certain preferred embodiment of the present invention has been shown and described in detail, it should be understood that various changes and modifications may be made without departing from the spirit or scope of the appended claims.

What is claimed is:

1. A structure for protecting a rod integrator of a projection display apparatus, said structure comprising:

a protecting tube for accommodating said rod integrator therein, said protecting tube comprising openings which are defined at positions that face a light incident surface and a light exiting surface of said rod integrator, respectively; and a light shield plate that is provided between an opening of said openings of said protecting tube and a light source for emitting light to said rod integrator, said opening of said protecting tube facing said light incident surface of said rod integrator, said light shield plate being spaced apart from said protecting tube, wherein said light shield plate has an opening for allowing light to pass therethrough so that the light introduces onto said rod integrator.

2. The structure according to claim 1, wherein said light shield plate is distanced apart from said opening of said protecting tube that faces said light incident surface at a predetermined gap, wherein said opening of said light shield plate is similar in shape to said opening of said protecting tube that faces said light incident surface.

3. The structure according to claim 1, wherein a size of said opening of said light shield plate is larger than a size of said opening of said protecting tube, said opening of said light shield plate facing said light incident surface of said rod integrator, and wherein said size of said opening of said protecting tube is larger than a size of said light incident surface of said rod integrator.

4. The structure according to claim 1, wherein said light shield plate and said protecting tube are independently supported on a support base of said structure.

5. The structure according to claim 1, further comprising:

a fan for supplying cooling air to a gap between said opening of said protecting tube and said light shield plate, said opening of said protecting tube facing said light incident surface of said rod integrator.

6. The structure according to claim 5, wherein said protecting tube has cooling fins which are provided on an outer circumferential surface thereof, and wherein said cooling fins are in contact with said cooling air that is supplied from said fan.

7. The structure according to claim 5, wherein said protecting tube has vane-like cooling fins which are provided along an edge of said protecting tube, said edge facing said light incident surface of said rod integrator, and wherein said cooling fins are in contact with said cooling air that is supplied from said fan.

8. The structure according to claim 1, wherein said light shield plate comprises a metal, and has a mirror-finish surface on a side of said light source.

9. A projection display apparatus provided with the structure according to claim 1.

10. The structure according to claim 1, wherein said light shield plate comprises a mirror-finish surface facing said light source, said mirror-finish surface reflecting a main part of an undesirable light that the light source emits to the light shield plate.

11. The structure according to claim 1, wherein said light incident surface is spaced apart from said opening of said protecting tube such that a predetermined distance is defined between the rod integrator and the protecting tube where the rod integrator faces said opening of said protecting tube.

12. The structure according to claim 1, wherein an area of the light incident surface of said rod integrator that enters the light from the light shield plate to the rod integrator is equal to an area of the light exiting surface of said rod integrator.

13. The structure according to claim 1, wherein a leaf spring holds the rod integrator within the protecting tube, said leaf spring mitigating stresses created by different thermal expansions of the rod integrator and the protecting tube.

14. The structure according to claim 1, wherein at least three sides of the rod integrator are spaced apart from the protecting tube, and wherein a leaf spring is disposed between one of the at least three sides of the rod integrator and the protecting tube to hold the rod integrator within the protecting tube.

15. A structure for protecting a rod integrator of a projection display apparatus, said structure comprising:

a protecting tube for accommodating said rod integrator therein, said protecting tube comprising an opening that faces a light incident surface of said rod integrator; and a light shield plate provided between the opening of said of said protecting tube and a light source that emits light to said rod integrator, said light shield plate comprising a mirror-finish surface that faces said light source to reflect a main part of an undesirable light that the light source emits to the light shield plate, wherein said light shield plate is spaced apart from said opening of said protecting tube at a predetermined distance, and wherein said light shield plate has an opening for guiding light from the light source to said incident surface of said rod integrator.

16. The structure according to claim 15, wherein said light incident surface is spaced apart from said opening of said protecting tube such that a predetermined distance is defined between the rod integrator and the protecting tube where the rod integrator faces said opening of said protecting tube.

17. The structure according to claim 15, wherein at least three sides of the rod integrator are spaced apart from the protecting tube, and wherein a leaf spring is disposed between one of the at least three sides of the rod integrator and the protecting tube to hold the rod integrator within the protecting tube.

18. The structure according to claim 15, wherein a size of said opening of said light shield plate is larger than a size of said opening of said protecting tube, said opening of said light shield plate facing said light incident surface of said rod integrator, and wherein said size of said opening of said protecting tube is larger than a size of said light incident surface of said rod integrator.

19. The structure according to claim 15, wherein said light shield plate and said protecting tube are independently supported on a support base of said structure.

20. A structure for protecting a rod integrator of a projection display apparatus, said structure comprising:

a protecting tube for accommodating said rod integrator therein, said protecting tube comprising an opening that faces a light incident surface of said rod integrator; and a metallic light shield plate provided between the opening of said of said protecting tube and a light source that emits light to said rod integrator, said light shield plate comprising a mirror-finish surface that faces said light source to reflect a main part of an undesirable light that the light source emits to the light shield plate, wherein said light shield plate is spaced apart from said opening of said protecting tube at a predetermined distance, wherein said light shield plate has an opening for guiding light from the light source to said incident surface of said rod integrator, wherein said light incident surface is spaced apart from said opening of said protecting tube such that a predetermined distance is defined between the rod integrator and the protecting tube where the rod integrator faces said opening of said protecting tube, wherein at least three sides of the rod integrator are spaced apart from the protecting tube, wherein a leaf spring is disposed between one of the at least three sides of the rod integrator and the protecting tube to hold the rod integrator within the protecting tube, wherein a size of said opening of said light shield plate is larger than a size of said opening of said protecting tube, wherein said size of said opening of said protecting tube is larger than a size of said light incident surface of said rod integrator, and wherein said light shield plate and said protecting tube are independently supported on a support base of said structure.

* * * * *